US006340504B1

(12) United States Patent
Neumann et al.

(10) Patent No.: US 6,340,504 B1
(45) Date of Patent: Jan. 22, 2002

(54) PROCESS FOR MAKING A RADIATION-CURED COATED ARTICLE

(75) Inventors: Paul Neumann, Louisville, KY (US); Donald P. Hart, Jr., Pittsburgh, PA (US)

(73) Assignee: Universal Woods Incorporated, Louisville, KY (US)

( * ) Notice: Subject to any disclaimer, the term of this patent is extended or adjusted under 35 U.S.C. 154(b) by 0 days.

(21) Appl. No.: 09/352,014

(22) Filed: Jul. 12, 1999

Related U.S. Application Data

(60) Provisional application No. 60/101,807, filed on Sep. 25, 1998.

(51) Int. Cl.[7] .................................................. C08F 2/46

(52) U.S. Cl. ....................... 427/493; 427/230; 427/299; 427/322; 427/385.5; 427/386; 427/389.8; 427/391; 427/395; 427/407.3; 427/411; 427/412.1; 427/412.5; 427/496; 427/508; 427/551; 427/553; 427/558; 427/559

(58) Field of Search ................................ 427/496, 508, 427/551, 553, 558, 559, 230, 299, 322, 385.5, 386, 389.8, 391, 395, 407.3, 411, 412.1, 412.5, 493

(56) References Cited

U.S. PATENT DOCUMENTS

| | | | |
|---|---|---|---|
| 4,395,263 | A | 7/1983 | Davis |
| 4,738,949 | A | 4/1988 | Sethi et al. |
| 5,013,711 | A | 5/1991 | Egashira et al. |
| 5,053,382 | A | 10/1991 | Akada et al. |
| 5,149,592 | A | 9/1992 | Wojnarowicz |
| 5,153,169 | A | 10/1992 | Freedman et al. |
| 5,234,983 | A | 8/1993 | Valenty |
| 5,354,794 | A | 10/1994 | Stevenson et al. |
| 5,371,058 | A | 12/1994 | Wittig, Jr. et al. |
| 5,387,573 | A | 2/1995 | Oldfield et al. |
| 5,405,824 | A | 4/1995 | Takeguchi et al. |
| 5,426,088 | A | 6/1995 | Janssens et al. |
| 5,427,997 | A | 6/1995 | Oshima et al. |
| 5,432,145 | A | 7/1995 | Oshima et al. |
| 5,478,629 | A | 12/1995 | Norman |
| 5,494,885 | A | 2/1996 | Kudo et al. |
| 5,514,637 | A | 5/1996 | Lum et al. |
| 5,527,759 | A | 6/1996 | Oshima et al. |
| 5,538,831 | A | 7/1996 | Oshima et al. |
| 5,545,606 | A | 8/1996 | Takiguchi et al. |
| 5,559,077 | A | 9/1996 | Martin |
| 5,571,765 | A | 11/1996 | Van Maele et al. |
| 5,646,089 | A | 7/1997 | Oshima et al. |
| 5,658,848 | A | 8/1997 | Abe et al. |
| 5,658,850 | A | 8/1997 | Taniguchi et al. |
| 5,686,382 | A | 11/1997 | Suzuki et al. |
| 5,710,096 | A | 1/1998 | Ohnishi et al. |
| 5,718,792 | A | 2/1998 | Goode |
| 5,728,645 | A | 3/1998 | Oshima et al. |
| 5,750,240 | A | 5/1998 | Findley et al. |
| 5,753,589 | A | 5/1998 | Takao et al. |

*Primary Examiner*—Bernard Pianalto
(74) *Attorney, Agent, or Firm*—Charles G. Lamb; Middleton & Reutlinger

(57) ABSTRACT

A coated plastic or high pressure laminated article and a process for making same includes coating a plastic or high pressure laminated substrate with a radiation curable top coat which may include ultraviolet inhibitors therein. The radiation curable top coat is subjected to a curing step which includes curing with either an electron beam, ultraviolet radiation or a combination thereof. The resulting article is a coated article which is comprised of a substrate coated with a radiation cured coating having an outer surface susceptible for receiving a sublimatable ink diffused therein.

21 Claims, 1 Drawing Sheet

PROCESS FOR MAKING A RADIATION-CURED COATED ARTICLE

CROSS REFERENCE TO RELATED APPLICATIONS

This application is a continuation of provisional application 60/101,807 filed Sep. 25, 1998.

BACKGROUND OF THE INVENTION

The invention relates to a process of coating a plastic or high pressure laminated substrate with a radiation-cured sublimatable coating and more particularly relates to a process which provides a plastic or high pressure laminated substrate with a coating which is capable of accepting sublimatable inks by means of dye sublimation.

It is known in the art to create sublimated products with radiation-cured coatings by adhering them to wood, ceramic, or metal substrates. These coatings which are typically a polyester, polyurethane or an acrylic are then susceptible to receiving designs of selected indicia transferred into them wherein the use of a sublimatable ink transfer and a heat press is designed to provide sufficient heat and pressure to make the transfer possible. However, at the temperatures normally employed in preparing the coating or in transferring the sublimatable inks to plastic substrates, plastic substrates are normally affected adversely. For example, the plastic substrates can accept these images prepared by die sublimation but are not durable and require additional protective layers after the sublimatable ink has been transferred thereon. It is known that certain plastics in film form such as MYLAR and polyethylene terephthalate (PET) can accept sublimation images without a coating. However, these films are typically thin and laminated to a substrate after sublimation and are relatively expensive.

SUMMARY OF THE INVENTION

It is an object of the present invention to provide a plastic substrate coated on at least one side with a radiation-cured coating capable of accepting sublimatable inks which diffuse into the radiation-cured coated layer.

It is even another object of the present invention to provide a plastic substrate having at least one side coated with a radiation-cured layer capable of withstanding the temperatures required for transferring sublimatable inks into the radiation-cured coating.

It is also an object of the present invention to provide a process for making printed articles by means of die sublimation including one or more coatings prepared by radiation curing.

More particularly, the present invention is directed to a process for making a cured coated article which may be a plastic or high pressure laminate which may include a plastic, the process including coating a plastic or high pressure laminate substrate with a radiation curable top coat and then subjecting the top coat to a curing step which is either with an electron beam, ultraviolet radiation or a combination thereof. A sublimatable ink may then be transferred into the top coat.

Even more particularly, the present invention is directed to a cured coated plastic or high pressure laminate article which is comprised of a plastic or high pressure laminate substrate coated with a radiation cured coating wherein the radiation cured coating includes an outer surface susceptible to having with a sublimatable ink diffused therein. The radiation cured coating may include ultraviolet inhibitors therein.

BRIEF DESCRIPTION OF THE DRAWINGS

A better understanding of the invention will be had upon reference to the following description in conjunction with the accompanying drawings in which like numerals refer to like parts throughout the several views and wherein.

DETAILED DESCRIPTION OF THE PREFERRED EMBODIMENT

Figure 1:
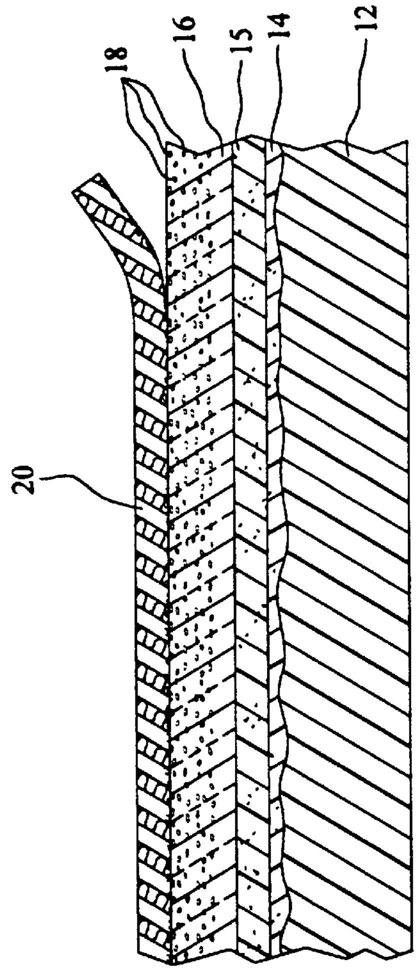
FIG. 1 is a cross-sectional view of the substrate coated according to a process of the invention showing the transfer of the sublimatable ink from a paper backing; and, FIG. 2 is a cross-sectional view of the substrate of FIG. 1 after the sublimation ink has been transferred.

As shown in the figures, a substrate material 12 with a thickness range generally of 0.005 to 0.250 inches is coated with a radiation-curable clear topcoat 16. The substrate 12 is either plastic or a high pressure laminate which may include a plastic. For example, the high pressure laminate is generally a thermally fused paper or a phenolic fused into a paper under heat or the like. Top coat 16 may include ultraviolet inhibitors therein, such as, for example, benzothiazoles, hindered amine light stabilizer and the like. In the preferred state, this substrate is a fiberglass reinforced plastic (FRP) with a fiberglass content of 8–30% or a phenolic impregnated resin which is optionally coated or filled with a filling or sealing coating 14 of a polyester or epoxy acrylate to fill in irregularities of the substrate 12. The optional fill layer 14 is generally ultraviolet (UV) radiation cured with 8 lamps at 300 watts intensity and a line speed of 65 feet per minute. The substrate 12 is then sanded both to increase smoothness and to provide a better physical bond for subsequent layers.

The filled substrate 12 may then be coated with a white layer 15, typically a polyester or urethane acrylate electron beam (EB) or UV curable product of 0.5 to 4 mils, preferably about 1.5 mils in thickness and then overcoated with a clear top coat 16. The top coat 16 may be one of a number of clear UV or EB/UV curable products including, but not limited to, polyesters, urethane acrylates, polyester acrylates, and epoxy acrylates as well as cationic cured systems which are known in the art. The preferred coating is a urethane acrylate/polyester acrylate blend. The top coat layer 16 will generally be about 0.2 to 6 mils but with a preferred thickness of about 2.8 mils of an acrylate. The coated substrate is then generally cured with an electron beam with preferred settings at 245 KV and 50 milliamps and a line speed of 90 feet a minute, preferably in an inert atmosphere, such as nitrogen. Alternatively, if a lower gloss is desired the product can be cured with a similar line speed and electron beam settings, but with a mixed nitrogen/oxygen atmosphere, preferably of about 94% nitrogen and 6% oxygen. This would then be followed by a UV cure in a fully inserted nitrogen atmosphere with 6 lamps at 200 watts and a line speed of 100 feet per minute to complete the curing process.

Another curing method is with ultraviolet radiation only. This cure can be carried out in an atmosphere ranging from 0 to 100% air with the balance typically made up of nitrogen. Lamp intensity will usually vary from 200 watts to 700 watts/inch cure systems with a typical setting of 300 watts/inch. If a white layer is utilized, one preferred curing method would be with a gallium doped mercury bulb UV system, typically at 300 watts/inch in air. It would typically be sanded after curing prior to the application of the clear topcoat or alternatively, the white coat may be slightly undercured to allow for a chemical bond between the two coating layers.

The electron beam or UV radiation coated substrate is now susceptible to the receipt of a sublimatable ink from a paper backed material and is identified in FIG. 1 by the numeral 20. The paper backed material 20 includes the sublimatable ink 18 thereon which is to be transferred to the top coat 16. The paper backing 20 with the ink 18 thereon is placed onto the top surface of the top coat 16 and under heat and sufficient pressure to hold the backing 20 firmly against the substrate 12. The ink is transferred to the clear top coat 16 usually at from 350° to 400° F.

Figure 2:
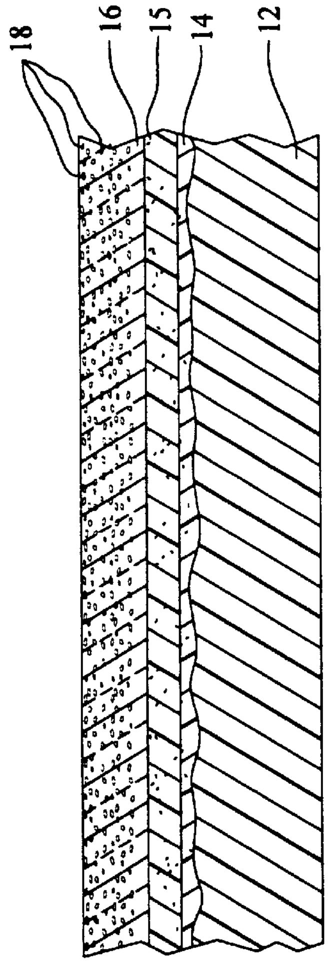

FIG. 2 shows the finished product after the sublimatable ink 18 has been transferred from the paper backing 20. As shown, the sublimatable ink 18 penetrates into the clear top coat 16 generally to a sufficient depth so as to be protected against the elements.

Some of the different articles which may be printed with the sublimatable ink in accordance with the present invention includes flexible plastic materials or other high pressure laminates for license plates, luggage tags, identification badges, signage, and the like.

It is realized that in the explanation of the present invention first and second coatings are exemplified. However, when the article or substrate 12 is a non-porous type article, a first coating or fill may not be necessary and the top coat 16 may be applied directly to the substrate 12.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the appended claims.

What is claimed is:

1. A process for making a cured sublimatable coated article comprising:

coating a substrate with a radiation curable top coat, said substrate being a plastic or a high pressure laminate;

subjecting said top coat to a curing step including curing with an electron beam, ultraviolet radiation, or a combination thereof; and, transferring a sublimatable ink to said top coat, said sublimatable ink penetrating into said top coat.

2. The process of claim 1, wherein said transferring includes placing a paperback sublimatable ink on said top coat at 350° F. to 400° F. with sufficient pressure to transfer said ink into said top coat.

3. The process of claim 1 wherein said plastic substrate is a fiberglass reinforced plastic or a phenolic resin impregnated paper.

4. The process of claim 3 wherein the content of said fiberglass in said fiberglass reinforced plastic is from 8 to 30 per cent by weight.

5. The process of claim 1 including the step of filling said substrate with a filling compound to form a fill substrate prior to coating with a radiation curable top coat.

6. The process of claim 5 wherein said filling compound is a polyester or an epoxy acrylate.

7. The process of claim 5 including curing of said filling compound with ultraviolet radiation.

8. The process of claim 7 including the step of sanding said cured substrate prior to coating with said radiation curable top coat.

9. The process of claim 5 wherein said coating includes a first coating of said fill substrate with a white coat and a second coating is with said radiation curable top coat.

10. The process of claim 9 wherein said white coat is a polyester acrylate or urethane acrylate, said white coat being electron beam or ultraviolet curable.

11. The process of claim 9 wherein said white coat is from 0.5 to 4.0 mils in thickness.

12. The process of claim 1 wherein said top coat is a polyester urethane acrylate, polyester acrylate, or epoxy acrylate.

13. The process of claim 1, said radiation curable top coat being from 0.2 to 6.0 mils in thickness.

14. The process of claim 13, said thickness being about 2.8 mils.

15. The process of claim 1, said electron beam curing being in an atmosphere of nitrogen.

16. The process of claim 1, said electron beam curing being in an atmosphere of about 94% nitrogen and 6% oxygen.

17. The process of claim 1, said ultraviolet curing being in a nitrogen atmosphere.

18. The process of claim 1, said electron beam curing being at 245 Kv and 50 milliamps.

19. The process of claim 1, said ultraviolet curing being in a nitrogen atmosphere with six lamps at 200 watts and a line speed of approximately 100 feet per minute.

20. The process of claim 1, said ultraviolet cured curing being in an atmosphere of 0 to 100% air with the balance being nitrogen.

21. The process of claim 1, said top coat including ultraviolet inhibitors therein.

* * * * *